(12) United States Patent
Sugimoto et al.

(10) Patent No.: US 7,664,470 B2
(45) Date of Patent: Feb. 16, 2010

(54) WIRELESS TRANSCEIVER AND METHOD FOR PRODUCING THE SAME

(75) Inventors: Keiichi Sugimoto, Kariya (JP); Mitsuru Nakagawa, Chiryu (JP)

(73) Assignee: Denso Corporation, Kariya (JP)

( * ) Notice: Subject to any disclaimer, the term of this patent is extended or adjusted under 35 U.S.C. 154(b) by 708 days.

(21) Appl. No.: 11/410,946

(22) Filed: Apr. 26, 2006

(65) Prior Publication Data

US 2006/0245170 A1  Nov. 2, 2006

(30) Foreign Application Priority Data

Apr. 27, 2005  (JP)  ............................. 2005-130274

(51) Int. Cl.
H04B 1/38  (2006.01)

(52) U.S. Cl. ................. 455/90.3; 455/575.1; 455/575.2; 455/575.9

(58) Field of Classification Search ................ 455/90.3, 455/575.1, 575.2, 556.1, 575.9, 73, 128, 455/347, 345
See application file for complete search history.

(56) References Cited

U.S. PATENT DOCUMENTS

| | | | |
|---|---|---|---|
| 5,632,168 | A | 5/1997 | Yano |
| 5,768,925 | A | 6/1998 | Ozawa et al. |
| 7,505,279 | B2 | 3/2009 | Ohtaki et al. |
| 2003/0159481 | A1 | 8/2003 | McGuire et al. |
| 2004/0185798 | A1* | 9/2004 | Ohtaki et al. .............. 455/90.3 |
| 2004/0237613 | A1 | 12/2004 | Shimura et al. |
| 2005/0136852 | A1 | 6/2005 | Nakagawa et al. |

FOREIGN PATENT DOCUMENTS

| | | |
|---|---|---|
| DE | 40 34 727 | 5/1992 |
| DE | 42 38 042 | 5/1994 |
| DE | 196 38 364 | 5/1998 |
| DE | 102 14 025 | 10/2003 |
| JP | 10-30746 | 2/1998 |
| JP | 10-264211 | 10/1998 |
| JP | 11-91510 | 4/1999 |

(Continued)

OTHER PUBLICATIONS

Korean Examination Report issued Apr. 30, 2007 in corresponding Korean Application No. 10-2006-37420, together with an English translation.
English Translation of the German Office Action dated Nov. 17, 2008 for corresponding DE Application No. 102006018900.0-31.
U.S. Appl. No. 11/411,151, filed Apr. 26, 2006.
Chinese Office Action dated May 22, 2009, issued in corresponding Chinese Application No. 200610077150.8, with English translation.

*Primary Examiner*—Tuan A Pham
(74) *Attorney, Agent, or Firm*—Nixon & Vanderhye P.C.

(57) ABSTRACT

A wireless transceiver includes a resin case having a hollow space that accepts the mechanical key, a mechanical key having a hook for engagement with the resin case, and a reinforcement made of a metal plate for reinforcing the resin case. The hollow space in the resin case is defined by a combination of a thin wall and a thick wall, and the resin case has a depression that accepts the hook on the mechanical key when the mechanical key is accepted in the hollow space. The reinforcement disposed in the proximity of the depression in the thin wall bridges the thin wall and the thick wall when the reinforcement is either embedded in or fixed on both of the thin wall and the thick wall.

10 Claims, 4 Drawing Sheets

FOREIGN PATENT DOCUMENTS

| | | |
|---|---|---|
| JP | 2001-301532 | 10/2001 |
| JP | 2004-52471 | 2/2004 |
| JP | 2004-134835 | 4/2004 |
| JP | 2004-263384 | 9/2004 |

* cited by examiner

WIRELESS TRANSCEIVER AND METHOD FOR PRODUCING THE SAME

CROSS REFERENCE TO RELATED APPLICATION

This application is based on and claims the benefit of priority of Japanese Patent Application No. 2005-130274 filed on Apr. 27, 2005, the disclosure of which is incorporated herein by reference.

FIELD OF THE INVENTION

The present invention generally relates to a wireless key having a resin case for accepting a mechanical key.

BACKGROUND OF THE INVENTION

Conventionally, a wireless transceiver for use in a portable device of Smart Key system (registered trademark) is carried by a user, and communicates with a station disposed on a vehicle when the user enters into the vehicle. The transceiver in the portable device of the Smart Key system allows the user to unlock a door of the vehicle, to start an engine or to perform other operation when the transceiver is merely carried by the user.

The transceiver includes a circuit board for mounting circuit parts and a battery as a power source in a resin case. The transceiver also includes a mechanical key stored therein for use in an emergency such as battery rundown, breakdown on the transceiver, or similar situation. The mechanical key is accepted in a hollow space in the resin case. In case of an emergency, the user pulls out the mechanical key from the hollow space of the resin case, and uses the key for unlocking the door or for other operation.

The mechanical key is locked in the hollow space by using a hook on a portion of the mechanical key. The hook has a button shape, and is movable in a vertical direction. The hook is accepted by a through hole at a position in the hollow space of the resin case. The hook has an elastic member disposed thereunder, thereby being allowed to move downward when depressed, and being allowed to move back to an original position when depressing force is removed.

The top of the hook is depressed downward into the portion of the mechanical key until the through hole accepts a convex shape of the hook when the mechanical key is inserted into the hollow space. In this manner, the mechanical key is engaged with the resin case so that the key does not mistakenly pull out.

However, the transceiver uses a more complicated and sophisticated system that tends to use an increased number of parts, while a volume of the transceiver body is required to be much more smaller in order to be conveniently carried by the user. That is, the transceiver having a thin card shape is particularly preferred.

In this case, dimension of the mechanical key is approximately 2 mm in thickness, and this allows a wall of the resin case on both sides of the key (i.e., a portion of the resin case around the hollow space) only to be in a thickness of 0.5 mm when a total thickness of the transceiver is 3 mm.

Further, the through hole for accepting the hook is formed in the portion having the thickness of 0.5 mm. This structure further decreases strength of the resin case in the proximity of the through hole. As a result, the resin case receiving a force from the elastic member under the hook may eventually be deformed or broken when the mechanical key is inserted into/pulled out from the resin case.

This kind of problem is commonly found in the transceiver for use in other type of keys, such as a key for opening/closing an office door, a key for operating a testing device or the like beside the transceiver for the Smart Key system for the vehicle.

SUMMARY OF THE INVENTION

In view of the above-described and other problems, the present invention provides a wireless transceiver that has a sufficient strength of a resin case at a position of a hook receptacle for engaging a hook of a mechanical key, when the mechanical key having the hook for fixation is accepted in the resin case.

The wireless transceiver having the mechanical key includes the resin case having the hollow space that accepts the mechanical key, and a reinforcement made of a metal plate for reinforcing the resin case. The mechanical key has a hook for engagement with the resin case and the hollow space is defined by a combination of a thin wall and a thick wall. The resin case has a depression that accepts the hook on the mechanical key when the mechanical key is accepted in the hollow space, and the reinforcement is disposed in a proximity of the depression in the thin wall. The reinforcement either being embedded in or fixed on the thin wall and the thick wall bridges the thin wall and the thick wall that is adjacent to the thin wall.

The structure of the wireless transceiver described above is reinforced by the reinforcement embedded in or fixed on both of the thin wall and the thick wall. That is, the reinforcement supports the thin wall in combination with the thick wall by bridging and joining the two walls. In this manner, the reinforcement made from the metal plate increases the strength of the resin case at the position around the depression. That is, the resin case has a sufficient strength around the depression for engaging the hook that prevents the fallout of the mechanical key.

In another aspect of the present invention, the wireless transceiver includes the depression that is a through hole for engagement with the hook. In this manner, the depression is easily made for having the above effect.

In yet another aspect of the present invention, the wireless transceiver includes the reinforcement that substantially surrounds the mechanical key accepted in the hollow space in the proximity of the depression. In this manner, the thin wall of the resin case is reinforced by the reinforcement around the depression, and the thin wall is also reinforced by the thick wall that is supported by the reinforcement extending over the thin wall and the thick wall. That is, the strength of the resin case for supporting the mechanical key is further increased.

In still yet another aspect of the present invention, the wireless transceiver includes a circuit board for implementing a circuit part on a mount surface, and at least the mount surface is sealed by molding when the resin case is molded.

In still yet another aspect of the present invention, the wireless transceiver has the resin case made from a thermosetting resin, and also has solder for soldering the circuit part having a melting point that is higher than a molding temperature of the resin case. In this manner, the resin case acquires a seal effect against water or the like beside achieving a reinforcement effect.

In still yet another aspect of the present invention, the wireless transceiver includes the hook that is disposed on a surface of a handle of the mechanical key, and the hook is supported by an elastic member disposed under the surface of the handle. The hook having the elastic member underneath is movable in a vertical direction from the surface of the handle.

In this manner, the mechanical key enters into or comes out from the hollow space in a non-obstructed manner for avoiding deformation/breakage of the thin wall of the resin case at the position around the depression for engaging the mechanical key.

In still yet another aspect of the present invention, a method of producing the wireless transceiver has the reinforcement either embedded in or fixed on the resin case when the resin case is molded. In this manner, the resin case of the transceiver easily achieves a reinforcement effect for the thin wall of the hollow space.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Preferred embodiments of the present invention are described with reference to the drawings. A wireless transceiver of the present invention is used in Smart Key system (registered trademark).

Figure 1:
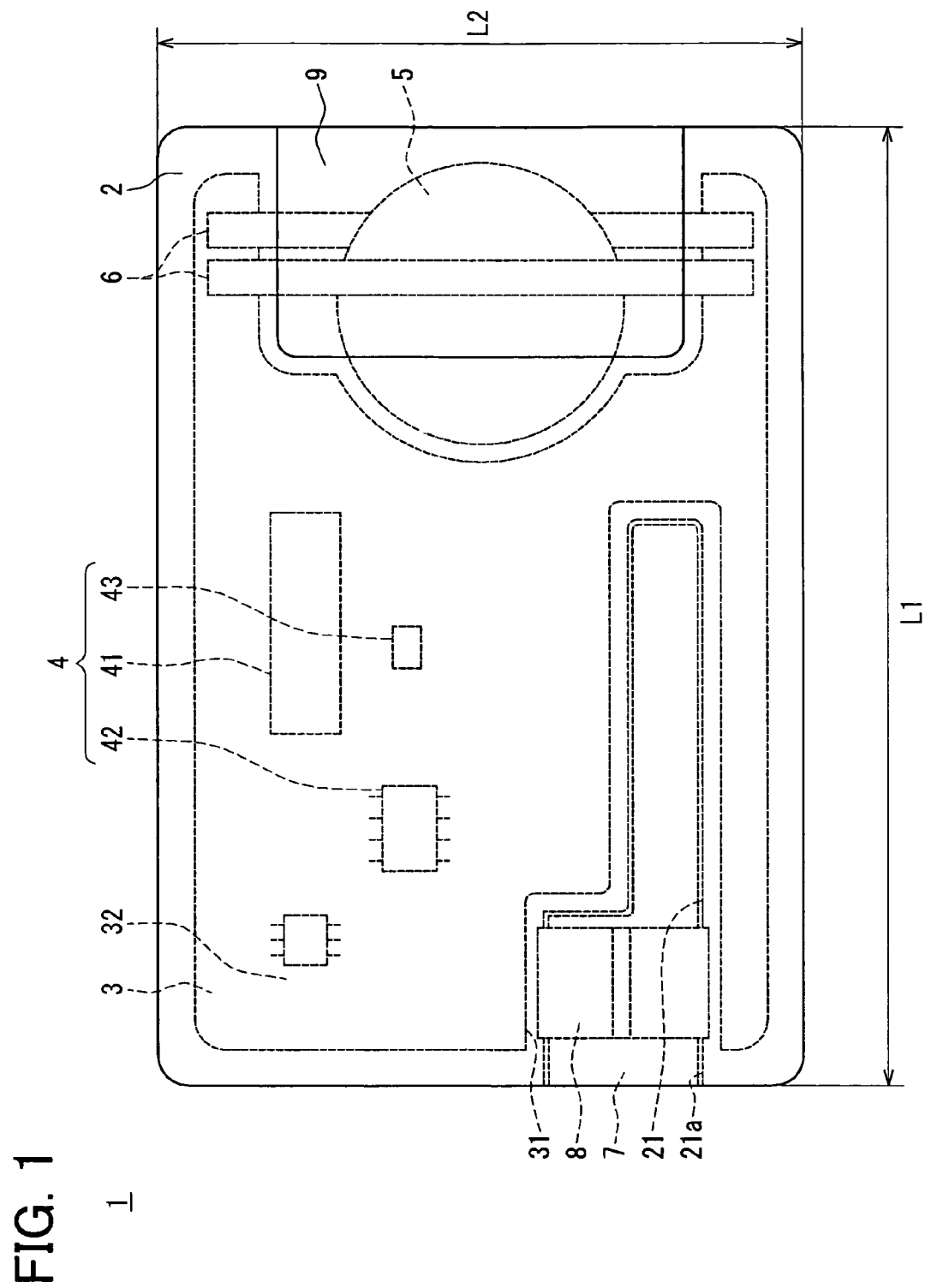
FIG. 1 shows a plan view of a wireless transceiver in an embodiment of the present invention.
Figure 2:
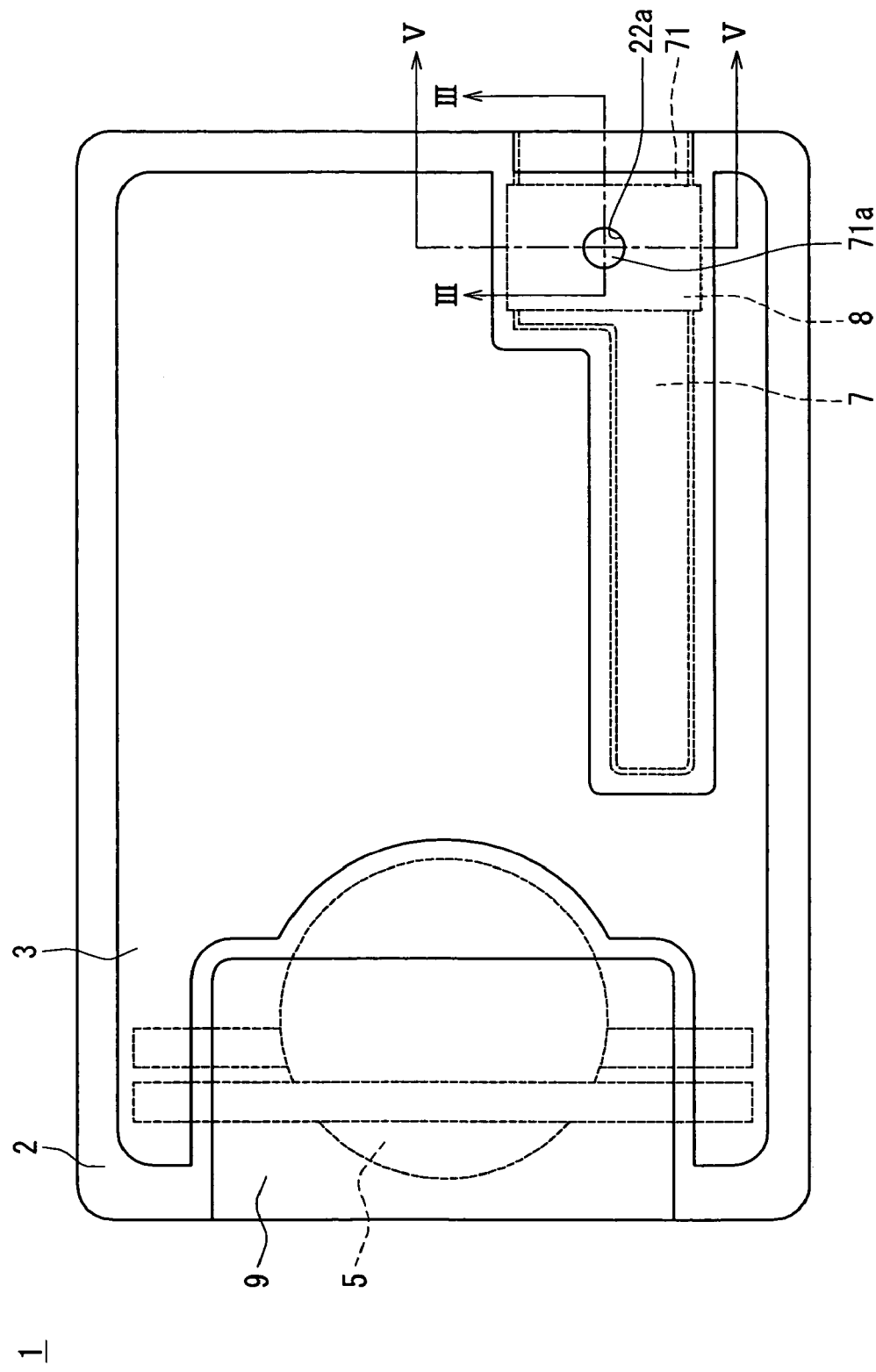
FIG. 2 shows a plan view of a reverse side of the wireless transceiver in FIG. 1.
Figure 3:
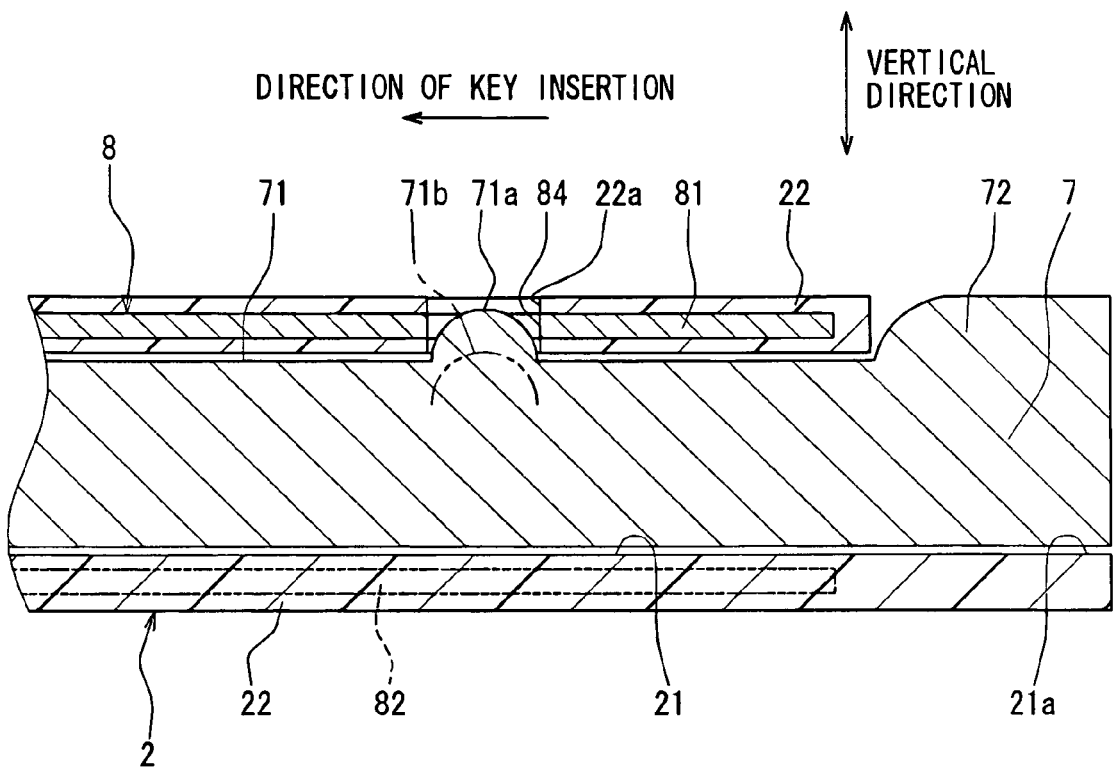
FIG. 3 shows a cross-sectional view of the wireless transceiver along III-III line in FIG. 2.

FIG. 1 shows a plan view of a wireless transceiver in an embodiment of the present invention. FIG. 2 shows a plan view of a reverse side of the wireless transceiver in FIG. 1. FIG. 3 shows a cross-sectional view of the wireless transceiver along III-III line in FIG. 2.

Figure 4A:
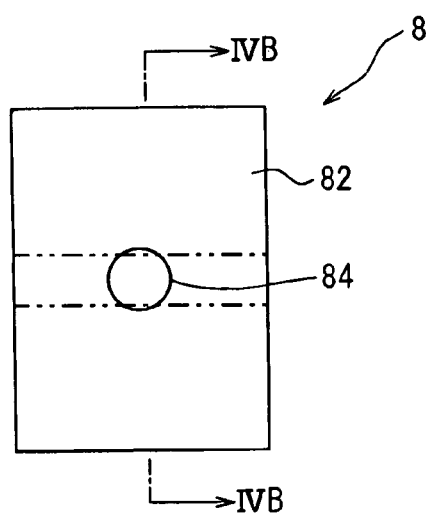
FIG. 4A shows a plan view of a collar for reinforcement.
Figure 4B:
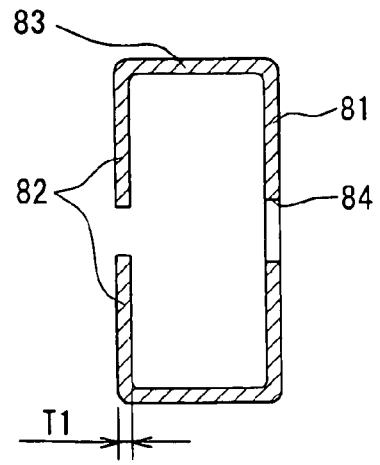
FIG. 4B shows a cross-sectional view of the collar along IVB-IVB line in FIG. 4A.
Figure 5:
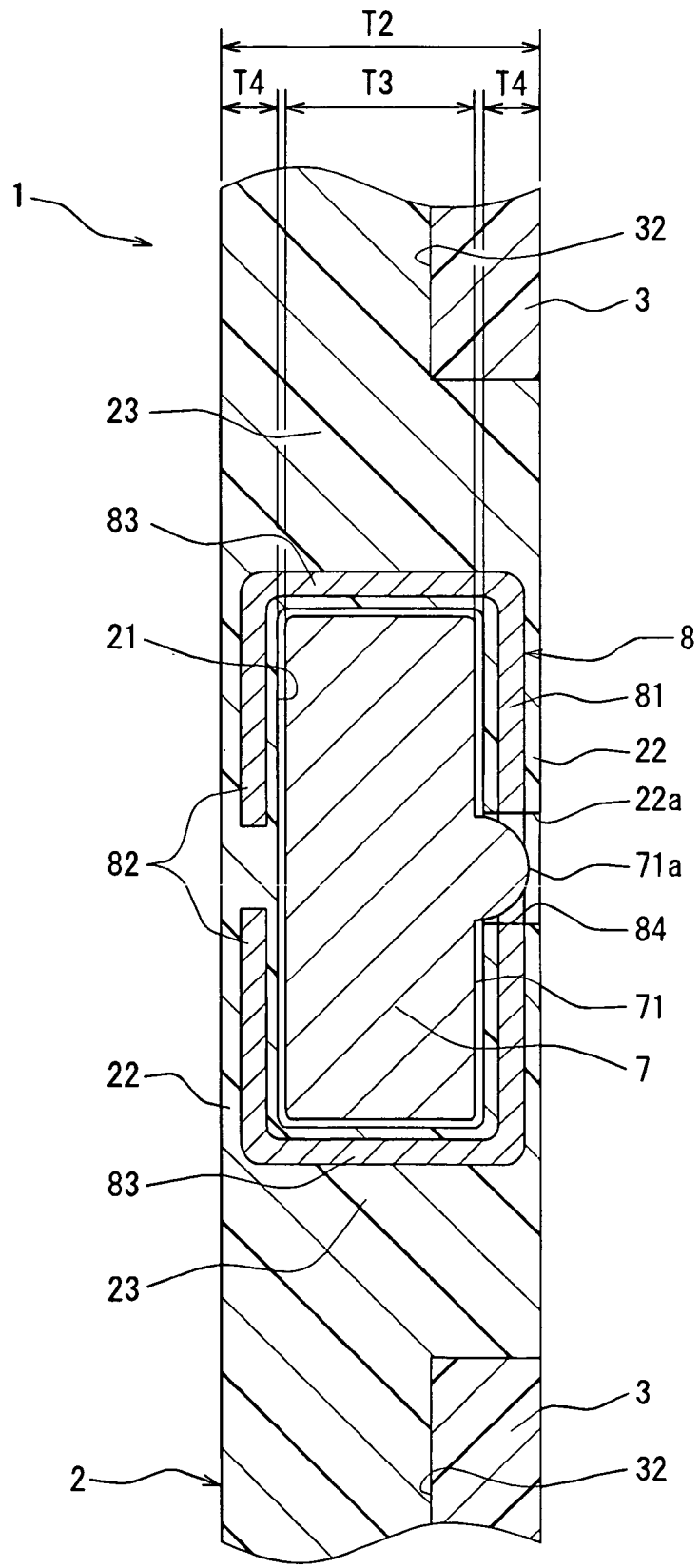
FIG. 5 shows a cross-sectional view of the wireless transceiver along V-V line in FIG. 2.

Further, FIG. 4A shows a plan view of a collar for reinforcement, FIG. 4B shows a cross-sectional view of the collar along IVB-IVB line in FIG. 4A, and FIG. 5 shows a cross-sectional view of the wireless transceiver along V-V line in FIG. 2.

The Smart Key system allows a user (a driver) to lock/unlock a door of a vehicle, to start an engine of the vehicle, or to perform other operation when the driver merely carries the transceiver 1.

The transceiver 1 includes a resin case 2, a circuit board 3, circuit parts 4, a battery 5, a terminal 6, a mechanical key 7, and a battery cover 9. The circuit parts 4 are mounted on the circuit board 3. The battery 5 is used as a power source. The terminal 6 electrically connects the circuit parts 4 and the battery 5 on the circuit board 3. The circuit board 3, the circuit parts 4, the battery 5, the terminal 6 and the mechanical key 7 are disposed inside of the resin case 2 and the battery cover 9.

The circuit board 3 is a circuit board that has a conductor pattern only on one side. The side of the circuit board 3 having the conductor pattern is a mount surface 32. The mount surface 32 has the circuit parts 4 mounted thereon. The circuit parts 4 transmits a response signal in response to a request signal when the transceiver 1 receives the request signal for recognition code (ID code) from the vehicle. The circuit parts 4 includes an antenna 41, a packaged integrated circuit (a packaged IC) 42 and other electronic part 43.

The mechanical key 7 is an emergency key for use in an emergency such as exhaustion of the battery 5, breakdown of the transceiver 1 or the like. The key 7 is stored in a hollow space 21 in the resin case 2. The hollow space 21 has an opening 21a, and the key 7 is inserted into the hollow space 21 through the opening 21a. The circuit board 3 has a concave portion 31 for allowing the hollow space 21 to be disposed in the resin case 2.

In case of exhaustion of the battery 5, breakdown of the transceiver 1 or similar situation, the mechanical key 7 is pulled out from the hollow space 21, and is used to unlock the door or to perform other operation.

The mechanical key 7 has a hook 71a in a button shape is disposed on a grip surface 71 of the key 7, and is movable in a vertical direction indicated by a two headed arrow in FIG. 3. The hook 71a prevents the key 7 from mistakenly falling from the resin case 2. The hook 71a is engaged with a through hole 22a that is disposed in the resin case 2 at a position of the hollow space 21 when the key is stored in the hollow space 21.

An elastic member not shown in the figure is disposed under the hook 71a, for elastically accepting and returning a force applied to the hook 71a. That is, the hook 71a sinks when the force is applied thereto from above, and the hook 71a returns to an original position when the force is removed.

The hook 71a is depressed into the grip surface 71 by a portion of a thin wall 22 that does not have the through hole 22a when the key 7 is inserted into the hollow space 21. The condition of depression is shown as a hook 71b in FIG. 3. The hook 71a is engaged with the through hole 22a when insertion of the key 7 into the hollow space 21 is complete. The state of insertion is shown as the hook 71a in FIG. 3. In this manner, the mechanical key 7 is prevented from mistakenly falling from the hollow space 21.

A protrusion 72 is used to pull the mechanical key 7 out from the hollow space 21. The user of the transceiver hooks the protrusion 72 by a nail or the like for pulling the key 7 out. The protrusion 72 is integrally formed as a part of the key 7 by using a metal. The protrusion 72 may also be formed by using a resin for disposing it on the key 7 made from the metal.

A collar 8 for reinforcement is made from a metal plate such as a stainless steel, a phosphor bronze or the like having a certain strength. The collar 8 is disposed on the resin case 2 at the position of the through hole 22a.

The stainless steel is an alloy made of material including a chrome and a nickel having resistance for oxidization and mechanical strength, and the phosphor bronze is an alloy mainly made of cupper and tin having mechanical strength.

The collar 8 is punched out from a stainless plate having a thickness T1 of 0.3 mm, and is bent to have a form as shown in FIG. 4. More practically, the collar 8 includes a first reinforcement portion 81 with a hole 84 punched out for engagement with the hook 71a, a support portion 83 that is raised from the first reinforcement portion 81, and a second reinforcement portion 82 that is bendingly formed from the support portion 83.

The resin case 2 is formed by molding the circuit parts 4 and the collar 8 after soldering the circuit parts 4 on the circuit board 3 as shown in FIG. 5. That is, the mount surface 32 of the circuit board 3 including the circuit parts 4 and a side face of the circuit board 3 as well as the collar 8 are sealed by the resin case 2. In this manner, the circuit parts 4 is sealed from water, and the circuit board 3 and the collar 8 are fixed in the resin case 2.

The circuit parts 4 are soldered before molding the resin case 2. Therefore, a melting point of the solder for soldering the circuit parts 4 must be higher than the molding temperature. In this case, for example, thermoplastic resin used to form the resin case 2 must have a molding temperature that is lower than the melting point of the solder for the circuit parts 4, thereby decreasing heat resistance of the resin case 2.

On the other hand, the resin case 2 formed with thermosetting resin can be molded under the melting point of the solder. Therefore, the thermosetting resin having high heat resistance is used to form the resin case 2. In this case, for example, the solder has the melting point of 200 to 300 degrees of Celsius, and an epoxy type thermosetting resin having the molding temperature of 170 degrees of Celsius are used to mold the resin case 2 of the wireless transceiver 1.

The user of the Smart Key system carries the transceiver 1 when he/she drives the vehicle, and the transceiver may preferably be stored in a card compartment of a wallet for portability. Therefore, the resin case 2 is formed substantially in a card shape, and dimension of the card shape is substantially set to comply with a ID-1 type card standard, that is, a dimension L1 is approximately 83 mm, a dimension L2 is approximately 58 mm, and a dimension T2 of thickness is approximately 3 mm as shown in FIGS. 1 and 5.

A thickness T3 of the mechanical key 7 is approximately 1.8 mm as shown in FIG. 5. Therefore, a thickness T4 left for a thin wall 22 of the hollow space 21 is approximately 0.5 mm. The hollow space 21 is surrounded by the thin wall 22 and a thick wall 23 in the resin case 2.

The first reinforcement portion 81 and the second reinforcement portion 82 in the collar 8 are disposed inside of the thin wall 22 of the resin case 2. The support portion 83 of the collar 8 is disposed inside the thick wall 23 of the resin case 2. That is, the collar 8 having the first reinforcement portion 81 and the support portion 83 in connection with the second reinforcement portion 82 is embedded in the thin wall 22 and in the thick wall 23 of the resin case 2 for bridging and connecting the thin wall 22 and the thick wall 23.

The resin case 2 is formed so that the through hole 22a and the hole 84 on the collar 8 coincide. That is, the collar 8 is embedded in the resin case 2 at a portion of the thin wall 22 and the thick wall 23 adjacent to the thin wall 22. The color 8 does not cover the through hole 22a in the thin wall 22. In this manner, the thin wall 22 of the resin case 2 is reinforced by the first reinforcement portion 81 in the proximity of the through hole 22a, and is further reinforced by the thick wall 23 of the resin case 2 because the thick wall 23 supported by the support portion 83 of the collar 8 is in association with the thin wall 22. Therefore, strength of the thin wall 22 is increased in the proximity of the through hole 22a. As a result, the strength of the structure of the resin case 2 is assured in the proximity of the through hole 22a in terms of supporting the mechanical key 7.

The hook 71a depressed by the thin wall 22 sinks under the surface 71 as shown as the hook 71b in FIG. 3. When the hook 71a is depressed, reactive force from the elastic member pushes back the thin walls 22 on both sides of the mechanical key 7. However, the collar 8 is formed to substantially surround the mechanical key 7 in the proximity of the through hole 22a in the hollow space 21 as shown in FIG. 5. Therefore, the thin walls 22 are reinforced by the collar 8, and are supported by the thick walls 23 in association with the collar 8 that bridges the thick walls 23 and the thin walls 22.

As a result, the strength of the resin case 2 in the proximity of the through hole 22a is further increased in terms of supporting the mechanical key 7.

The wireless transceiver 1 in the present embodiment of the present invention includes the mechanical key 7 with the hook 71a, the resin case 2 having the hollow space 21 that accepts the mechanical key 7 and the collar 8 made from a metal for reinforcing the resin case 2 having the thin walls 22 and the thick walls 23. One of the thin wall 22 of the resin case 2 has the through hole 22a for accepting the hook 71a of the key 7 stored in the hollow space 21, and the collar 8 is embedded in the thin walls 22 and the thick wall 23 except for a portion around the through hole 22a. The collar 8 bridges the thin wall 22 and the thick wall 23 adjacent to the thin wall 22. In this manner, strength of the resin case 2 is increased for supporting the mechanical key 7 in the hollow space 21.

Although the present invention has been fully described in connection with the preferred embodiment thereof with reference to the accompanying drawings, it is to be noted that various changes and modifications will become apparent to those skilled in the art.

For example, the holder 8 may be disposed on an inside surface of the hollow space 21. That is, the holder 8 may be exposed from the resin case 2 in the hollow space 21.

Further, a concave portion instead of the through hole 22a may be disposed in the hollow space 21 for engaging the hook 71a on the key 7.

Furthermore, the circuit board 3 may have the conductor pattern on both sides. In this case, the mount surface 32 on both sides of the circuit board 3 are sealed by the resin case 2.

Furthermore, the wireless transceiver 1 of the present invention may be used in a system for office door operation, testing device operation or the like as well as the Smart Key system in the vehicle.

In other words, the wireless transmitter of the present invention may be used in a system as long as the system allows the wireless transceiver to have above-described feature of the present invention.

Such changes and modifications are to be understood as being within the scope of the present invention as defined by the appended claims.

What is claimed is:

1. A wireless transceiver having a mechanical key comprising:
    a resin case having a hollow space that accepts the mechanical key; and
    a reinforcement made of a metal plate for reinforcing the resin case,
    wherein the mechanical key has a hook for engagement with the resin case,
    the hollow space is defined by a combination of a thin wall and a thick wall,
    the resin case has a depression in the thin wall of the hollow space that accepts the hook on the mechanical key when the mechanical key is accepted in the hollow space,
    the reinforcement includes reinforcement portions disposed inside the thin wall of the hollow space in a proximity of the depression in the thin wall of the hollow space,
    the reinforcement is either embedded in or fixed on both the thin wall and the thick wall that define the hollow space, and
    the reinforcement bridges the thin wall and the thick wall that is adjacent to the thin wall.

2. The wireless transceiver according to claim 1, wherein the depression is a through hole for engagement with the hook.

3. The wireless transceiver according to claim 1, wherein the reinforcement substantially surrounds the mechanical key accepted in the hollow space in the proximity of the depression.

4. The wireless transceiver according to claim 1 further comprising:

a circuit board for implementing a circuit part on a mount surface, wherein at least the mount surface is sealed by molding when the resin case is molded.

5. The wireless transceiver according to claim 4, wherein the resin case is made from a thermosetting resin, and solder for soldering the circuit part has a melting point that is higher than a molding temperature of the resin case.

6. The wireless transceiver according to claim 1, wherein the hook is disposed on a surface of a handle of the mechanical key, the hook is supported by an elastic member disposed under the surface of the handle of the mechanical key, and the hook is movable in a direction that is perpendicular to the surface of the handle.

7. A method for producing a wireless transceiver having a mechanical key comprising:

providing a reinforcement made of a metal plate for reinforcing the resin case, molding a resin case having a hollow space that accepts the mechanical key with the reinforcement at least partially encircling the hollow space that accepts the mechanical key; and wherein the reinforcement is either embedded in or fixed on the resin case when the resin case is molded, the mechanical key has a hook for engagement with the resin case, the hollow space is defined by a combination of a thin wall and a thick wall, the resin case has a depression in the thin wall of the hollow space that accepts the hook on the mechanical key when the mechanical key is accepted in the hollow space, the reinforcement includes reinforcement portions disposed inside the thin wall of the hollow space in a proximity of the depression in the thin wall, the reinforcement is either embedded in or fixed on both the thin wall and the thick wall that define the hollow space, and the reinforcement bridges the thin wall and the thick wall that is adjacent to the thin wall.

8. The method for producing the wireless transceiver according to claim 7, wherein the depression is a through hole for engagement with the hook.

9. The method for producing the wireless transceiver according to claim 7, wherein the reinforcement substantially surrounds the mechanical key accepted in the hollow space in the proximity of the depression.

10. The wireless transceiver of claim 1, wherein portions of the reinforcement are disposed inside both the thin wall and the thick wall of the resin case.

\* \* \* \* \*